(12) United States Patent
Fallas

(10) Patent No.: US 7,644,558 B1
(45) Date of Patent: Jan. 12, 2010

(54) ROBOTIC CASE PACKING SYSTEM

(76) Inventor: David M. Fallas, 3120 Inverness Dr., Waco, TX (US) 76710

( * ) Notice: Subject to any disclaimer, the term of this patent is extended or adjusted under 35 U.S.C. 154(b) by 0 days.

(21) Appl. No.: 11/553,348

(22) Filed: Oct. 26, 2006

(51) Int. Cl.
B65B 5/08 (2006.01)

(52) U.S. Cl. .................................. 53/251; 901/7

(58) Field of Classification Search ........... 53/249–251; 414/733; 901/7, 15, 17
See application file for complete search history.

(56) References Cited

U.S. PATENT DOCUMENTS

| | | | |
|---|---|---|---|
| 1,388,668 A | | 8/1921 | Schumacher |
| 1,766,573 A | | 6/1930 | Westin |
| 2,235,725 A | | 3/1941 | Nordquist |
| 2,443,952 A | | 6/1948 | Gilbert |
| 2,597,069 A | | 5/1952 | Conti |
| 2,788,113 A | | 4/1957 | De Waal |
| 2,849,116 A | | 8/1958 | Fried |
| 2,905,310 A | | 9/1959 | Stoeckel et al. |
| 2,941,676 A | | 6/1960 | Harker |
| 2,948,417 A | | 8/1960 | Haanes |
| 2,956,384 A | | 10/1960 | Underwood |
| 3,022,620 A | | 2/1962 | Gallet |
| 3,224,549 A | | 12/1965 | Cella et al. |
| 3,319,767 A | | 5/1967 | Breternitz et al. |
| 3,389,906 A | | 6/1968 | Walton |
| 3,445,980 A | | 5/1969 | Salomon |
| 3,481,465 A | | 12/1969 | Way |
| 3,488,917 A | | 1/1970 | Oswald et al. |
| 3,512,336 A | | 5/1970 | Rosecrans |
| 3,575,276 A | | 4/1971 | Rupert |
| 3,590,972 A | | 7/1971 | Mosterd |
| 3,614,853 A | | 10/1971 | Seragnoli |
| 3,665,148 A | * | 5/1972 | Yasenchak et al. .............. 901/7 |
| 3,673,756 A | | 7/1972 | Prete et al. |
| 3,673,759 A | | 7/1972 | Ayres et al. |

(Continued)

FOREIGN PATENT DOCUMENTS

CA 2054074 C 1/1996

(Continued)

OTHER PUBLICATIONS

Bosch, Robert, "GSH 5030: High-performance multi-bag packer, output of up to 180 bags per minute, independent of the pack pattern", Bosch Information Leaflet.

(Continued)

*Primary Examiner*—Stephen F Gerrity
(74) *Attorney, Agent, or Firm*—Wong, Cabello, Lutsch, Rutherford & Brucculeri, LLP

(57) ABSTRACT

A robotic case packing system loads articles from a moving conveying system into a container. The system has a pivot drive shaft pivotally connected to a support frame for selective rotation about a selected axis of rotation and has a drive linkage operatively connected between a servo motor and to the pivot drive shaft to selectively pivot the pivot drive shaft. A two-axis-robot is mounted on the pivot drive shaft along the axis of rotation such that movement of the two-axis-robot along its two axes of movement occurs within planes substantially parallel to the axis of rotation. A controller operatively connected to the servo motor is used to selectively actuate the servo motor to rotate the pivot drive shaft in order to enable selective picking and placing of articles with the robotic case packing system.

2 Claims, 12 Drawing Sheets

U.S. PATENT DOCUMENTS

| | | | |
|---|---|---|---|
| 3,680,395 A | 8/1972 | Douglas | |
| 3,685,631 A | 8/1972 | Harris | |
| 3,729,085 A | 4/1973 | Schlueter et al. | |
| 3,736,997 A | 6/1973 | Bottorf | |
| 3,778,965 A | 12/1973 | O'Lenick et al. | |
| 3,783,584 A | 1/1974 | Rauser | |
| 3,783,587 A * | 1/1974 | Kurtenbach | 53/250 |
| 3,914,919 A | 10/1975 | Boissy et al. | |
| 3,955,665 A | 5/1976 | Pettis | |
| 3,974,888 A | 8/1976 | Murakami et al. | |
| 4,113,124 A | 9/1978 | Muntjanoff | |
| 4,135,346 A | 1/1979 | Rebsamen | |
| 4,135,616 A | 1/1979 | Pellaton | |
| 4,137,977 A | 2/1979 | Alger | |
| 4,344,493 A | 8/1982 | Salmonsen | |
| 4,356,906 A | 11/1982 | Fallas | |
| 4,398,383 A | 8/1983 | Prakken | |
| 4,407,107 A | 10/1983 | Smith | |
| 4,486,843 A * | 12/1984 | Spongh et al. | 901/7 |
| 4,514,963 A | 5/1985 | Bruno | |
| 4,583,351 A | 4/1986 | Fallas | |
| 4,660,352 A | 4/1987 | Deines et al. | |
| 4,764,077 A * | 8/1988 | Susnjara | 901/7 |
| 4,768,328 A | 9/1988 | Mims | |
| 4,781,011 A | 11/1988 | Prakken | |
| 4,846,336 A | 7/1989 | Hoyland et al. | |
| 4,864,801 A | 9/1989 | Fallas | |
| 4,867,299 A | 9/1989 | Fukuoka et al. | |
| 4,887,341 A * | 12/1989 | Sakimori et al. | 901/7 |
| 4,901,808 A | 2/1990 | Wu | |
| 4,976,582 A | 12/1990 | Clavel | |
| 4,991,708 A | 2/1991 | Francioni | |
| 5,088,569 A | 2/1992 | Checcucci | |
| 5,123,231 A | 6/1992 | Fallas et al. | |
| 5,172,800 A | 12/1992 | Brown et al. | |
| 5,186,306 A | 2/1993 | Sjostrand | |
| 5,197,584 A | 3/1993 | Powell et al. | |
| 5,239,807 A * | 8/1993 | Soleri | 53/244 |
| 5,244,100 A | 9/1993 | Regier | |
| 5,286,160 A * | 2/1994 | Akeel et al. | 901/7 |
| 5,306,877 A | 4/1994 | Tas | |
| 5,308,930 A | 5/1994 | Tokutu et al. | |
| 5,326,218 A | 7/1994 | Fallas | |
| 5,369,222 A | 11/1994 | Strelioff | |
| 5,383,561 A | 1/1995 | Tokutu | |
| 5,415,267 A | 5/1995 | Sato et al. | |
| 5,487,257 A * | 1/1996 | Domeier et al. | 53/251 |
| 5,692,593 A | 12/1997 | Ueno et al. | |
| 5,966,900 A | 10/1999 | Burford et al. | |
| 5,996,308 A * | 12/1999 | Nakamura | 53/251 |
| 6,003,284 A | 12/1999 | Goodman | |
| 6,061,996 A | 5/2000 | Vissers et al. | |
| 6,252,181 B1 | 6/2001 | Fallas | |
| 6,540,063 B1 | 4/2003 | Fallas | |
| 6,655,901 B2 * | 12/2003 | Tsubota et al. | 901/15 |
| 6,874,615 B2 | 4/2005 | Fallas | |
| 2003/0014944 A1 * | 1/2003 | Bennett | 53/247 |

FOREIGN PATENT DOCUMENTS

| | | | |
|---|---|---|---|
| CA | 2117020 C | | 9/2004 |
| EP | 0385245 | | 9/1990 |
| GB | 1103496 | | 2/1968 |
| GB | 1363548 | | 8/1974 |
| GB | 1412679 | | 11/1975 |
| GB | 2218679 A | | 11/1989 |
| GB | 2227217 A | | 7/1990 |
| GB | 2253826 A | | 9/1992 |
| GB | 2275980 A | | 9/1994 |
| JP | 55044489 | | 3/1980 |
| JP | 2-218578 A | * | 8/1990 |

OTHER PUBLICATIONS

Brochure for Fallas (Brand) Model Index 100-Automatic Case Packer for Lay Flat Flexible Bags.
Schubert (Brand) Packaging Robots Brochure.
Hulbritt (Brand) "Flexi Packer" Brochure.
Dyna-Pak (Brand) Case Packers Brochure.
Advertisement for a Salwasser (Brand) Case Loading Machine.
Flyer: Fallas Automatic Case Loader ACL-CP.
Brochure: Fallas "SLA Auto" Case Packer, copyright 1988.
McGraw-Hill Encyclopedia of Science & Technology, 7th Edition, 1992, vol. 10 pp. 98-99; vol. 15 pp. 516-522; vol. 9 pp. 537; vol. 10 pp. 572-576.
Brochure from Sabel Engineering Corporation on a case packer, copyright 1982.
Brochure for Lightning (brand) case packers.
Fanuc Robotics America, Inc.; Brochure for "Food-Grade Robots" (c)2006.
AF Automation; Brochure for "TwinLine Two-Axis Robot: The versatile Twin-Axis Robot for Flexibility and Productivity".
"Delta Parallel Robot—The Story of Success;" downloaded from http://www.parallelemic.org/Reviews/Review002p.html.
Fallas Automation; Brochure for "The 600 Series: The Quattro One-Touch (TM) robotic case packing system".
"Two-Axis Robot Suits Vertical Cartoning and Case Packaging," dated Sep. 20, 2002, obtained from http://news.thomasnet.com/fullstory/14316, generated May 8, 2009.
Oystar, "Oystar A+F: Twinline Twin Axis Robot," Product Brochure, undated.

* cited by examiner

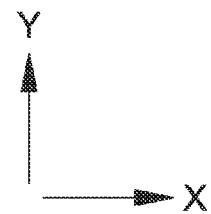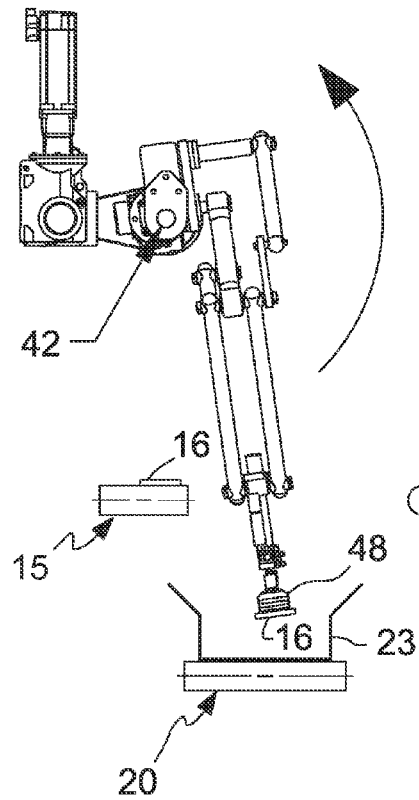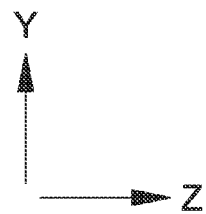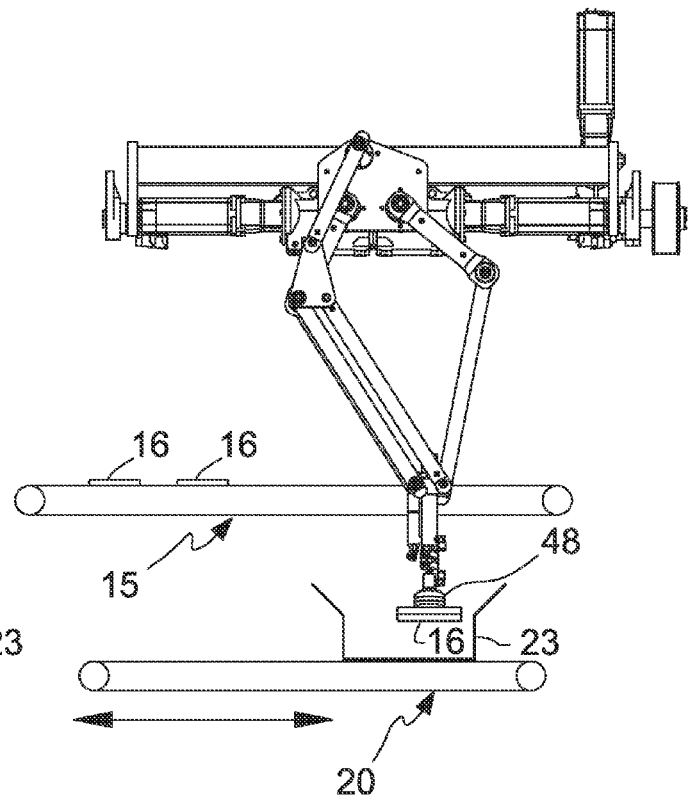
FIG. 12  FIG. 13

ROBOTIC CASE PACKING SYSTEM

BACKGROUND OF THE INVENTION

1. Field of the Invention

The present invention relates to case packing systems and, more particularly, it relates to a robotic case packing system for loading articles from a moving conveyor belt or similar moving conveyor system into a container such as a corrugated cardboard box.

2. Description of Related Art

For many years, attempts have been made to develop improved systems for picking up individual articles of product from a conveyor belt or similar moving conveyor system and depositing those articles within a container such as a corrugated cardboard box. The issues presented include how to accomplish this task, with both the desired speed and the desired accuracy. To meet the demand for speed, past solutions have included incorporation of multiple robots along the conveyor. For example, see the device described in applicant's U.S. Pat. No. 6,540,063, which patent is fully incorporated herein by reference. Often, if four such robot heads were used, each head would pick up every fourth article of product in a conveying system in a staggered manner such that the four robot heads effectively removed four consecutive articles of product during each iteration. While this multiplicity of heads did provide for a multiplying of speed, the means for moving the robot heads from the conveying belt and to the container were often awkward or cumbersome in implementation. Similarly, such systems were sometimes limited to loading cases only in multiples of the number of heads within the system. For example, if four heads were used, a case could be loaded with four, eight, or twelve articles; but it could not be loaded with seven or fifteen articles without complex programming or a drop in efficiency.

To provide greater flexibility, multi-axis robots have been developed for picking an article off of a common belt. Many such multi-axis robots, however, have proven to be fairly slow and heavy. Hence, while such robots may provide greater flexibility in motion, they have also provided a need for an even greater number of robots to meet the speed requirements in the marketplace today. Additionally, it has been found that with some three-axis robots, the range of movement may be limited in certain directions. For example, certain three-axis robots are very limited in their vertical component, which can make movement of a bag from a conveying belt into a deep container difficult.

Moreover, while two-axis robots provide a desired range of horizontal and vertical motion in a single plane, such robots do not generally accommodate three dimensional movement of an article from a conveyor belt over and down into a container unless the third element of motion is otherwise provided. To address this problem, attempts have been made to move a two-axis robot back and forth on linear slides to thereby introduce the third element of motion. This approach, however, appears to limit operating speed and increase the cost of the structure.

It is therefore desirable to provide an improved system that has the desired speed of operation with the desired range of movement, and that accurately picks articles of product from a conveying system and places them into a container.

SUMMARY OF THE INVENTION

The present invention overcomes the disadvantages of the prior art through a robotic case packing system for loading articles from a moving conveyor system into a container. In particular, the case packing system of the present invention utilizes a two-axis-robot that is mounted for pivotal oscillation to provide the desired third axis of movement. More specifically, the robotic case packing system of the present invention includes a supporting frame. A pivot drive shaft is pivotally mounted on the frame for selective rotation about a selected axis of rotation that, in use, is parallel or substantially parallel to the line of motion of articles on an associated conveyor belt. The case packing system also includes a servo motor mounted to the frame and a drive linkage operatively connected between the servo motor and the pivot drive shaft to selectively pivot the drive shaft when the servo motor is actuated in use. A two-axis robot is mounted on the pivot drive shaft along the axis of rotation such that movement of the two-axis robot along its two axes of movement occurs within planes that are substantially parallel to the axis of rotation of the pivot drive shaft. The present invention further includes a controller for selectively rotating the pivot drive shaft in order to enable selective picking and placing of articles of product in use.

In a more detailed embodiment of the present invention, the invention includes a product conveyor for conveying a plurality of articles along a selected, known line of motion. The packing system further includes a case conveyor operatively disposed in relation to the product conveyor to deliver containers to a pre-selected location horizontally beneath the line of motion of the product conveyor. A support frame is operatively disposed adjacent to the product conveyor and the case conveyor. A servo motor is mounted to a support frame. A pivot drive shaft is also pivotally mounted on the support frame and adapted for selective rotation about a selected axis of rotation, which axis of rotation is substantially parallel to the line of motion for product moving along the product conveyor. The invention further includes a drive linkage operatively connected between the servo motor and the pivot drive shaft to selectively pivot the pivot drive shaft upon the selective actuation of the servo motor. A two-axis-robot is operatively mounted on the pivot drive shaft along the axis of rotation such that movement of the two-axis robot along its two axes of movement occurs within planes substantially parallel to the axis of rotation. The invention further includes a controller for selectively actuating the servo motor and the two-axis-robot to effect the desired rotation of the pivot drive shaft and the two-axis-robot to enable the selective picking and placing of articles utilizing the two-axis-robot.

Accordingly, when the case packing system is utilized, the product conveyor conveys a line of spaced articles (which can be selectively spaced or randomly spaced) along the conveyor. The two-axis robot is pivoted toward the product conveyor so that the robot head on the two-axis-robot is aligned with the conveyor when the two-axis-robot extends downwardly toward the conveyor. The two-axis-robot is actuated to extend the robot head downwardly to the conveyor to pick up an article of product from the conveyor. The servo motor is then actuated to rotate the pivot drive shaft to cause the head of the two-axis-robot to be aligned with the container upon downward movement of the robot head toward the container. The two-axis-robot is then actuated to move the robot head downwardly into the container to deposit an article of product within the container. The two-axis-robot is then lifted and oscillated back toward the conveyor belt to retrieve additional product. This process is repeated until the case is loaded with the desired quantity and a new case is moved into place under the two-axis-robot.

The robot case packing system of the present invention thereby overcomes the disadvantages of the devices of the prior art by providing a system for introducing the third component of motion for a two-axis-robot without the use of complex machinery and linear slides. It is believed that this simplified motion greatly enhances speed and predictability.

BRIEF DESCRIPTION OF THE DRAWINGS

This invention will further be illustrated in reference to the appended drawings which illustrate a particular embodiment of the robotic case packing system of the present invention.

FIG. 12 is an end view of the robotic case packing system of the present invention illustrating the position of the robotic case packing system as it is about to deposit a product in a container.

FIG. 13 is a side view of the robotic case packing system shown in FIG. 12.

DETAILED DESCRIPTION OF THE PREFERRED EMBODIMENT

The present invention is disclosed in conjunction with a preferred embodiment. It should be understood however that variations of this embodiment may be undertaken in accordance of the spirit and scope of the present invention.

Figure 1:
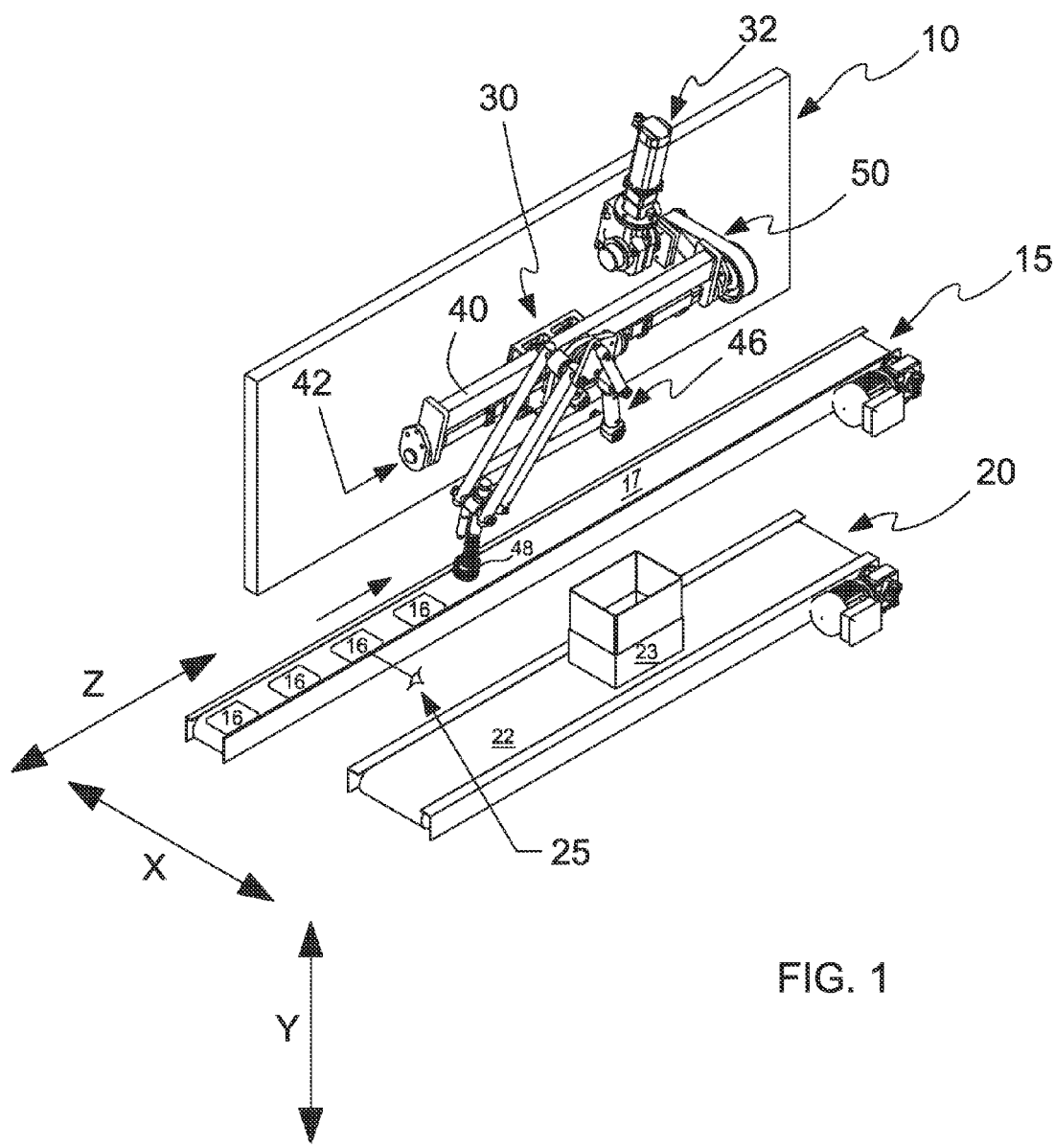
FIG. 1 is an isometric view illustrating the spatial relationship of the product conveyor, the container conveyor, and the two-axis-robot of the present invention at a starting position.
Figure 2:
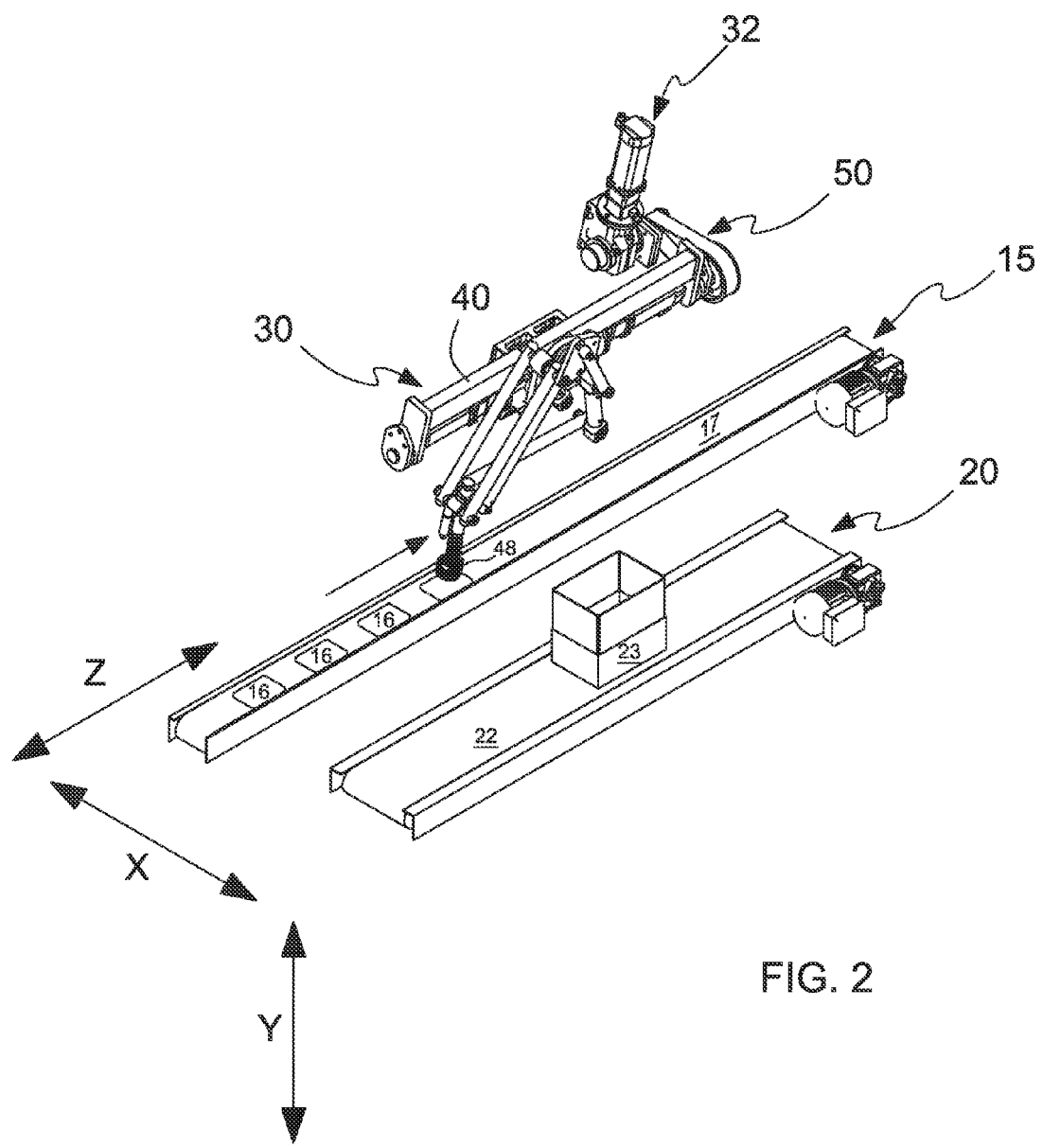
FIG. 2 is an isometric view of the case packing system shown in FIG. 1 illustrating the vacuum pick head of the case packing system tracking as article on the product conveyor.
Figure 3:
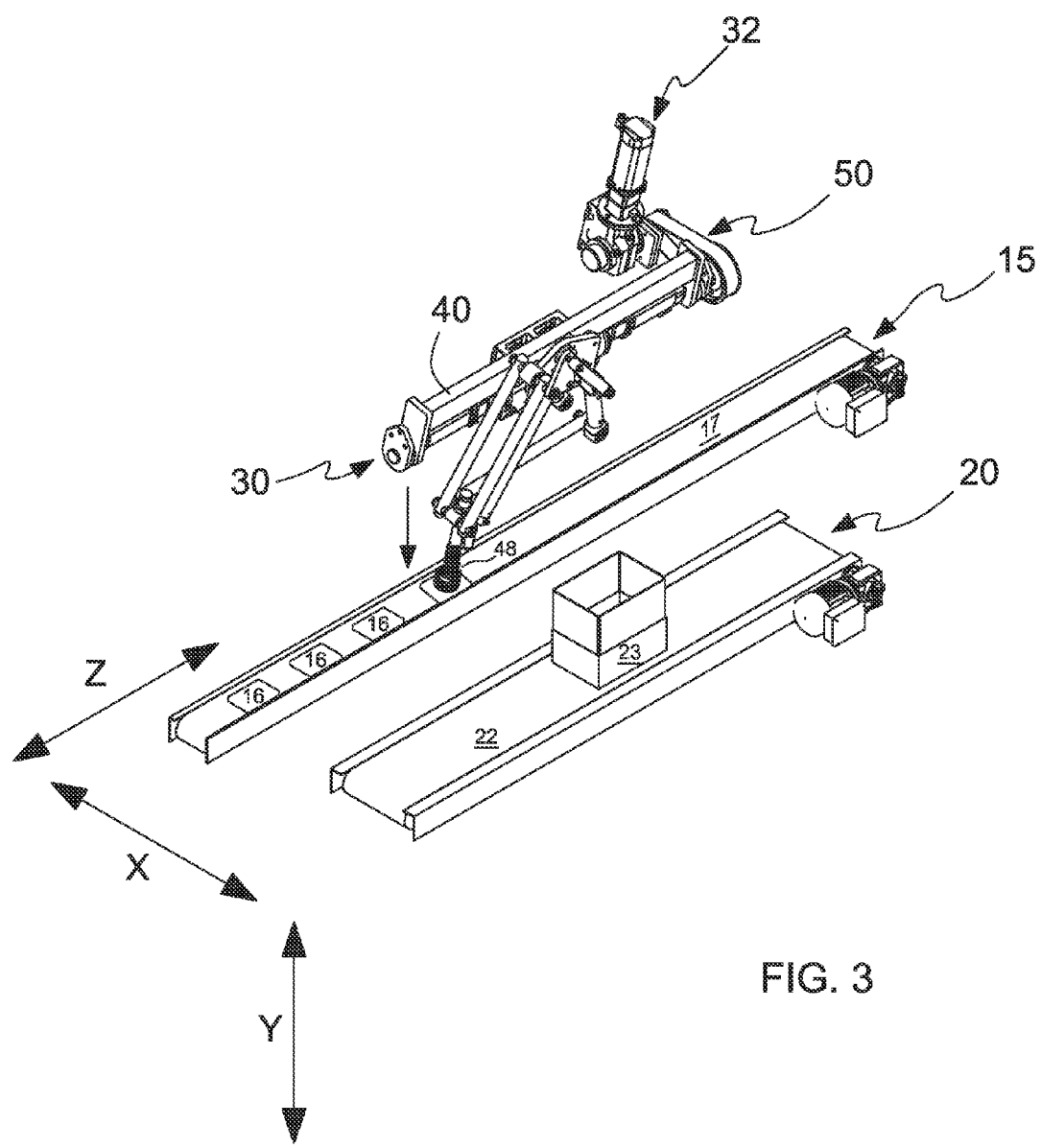
FIG. 3 is an isometric view illustrating the robotic case packing system of the present invention at the moment of picking up a first article of product from the product conveyor.
Figure 4:
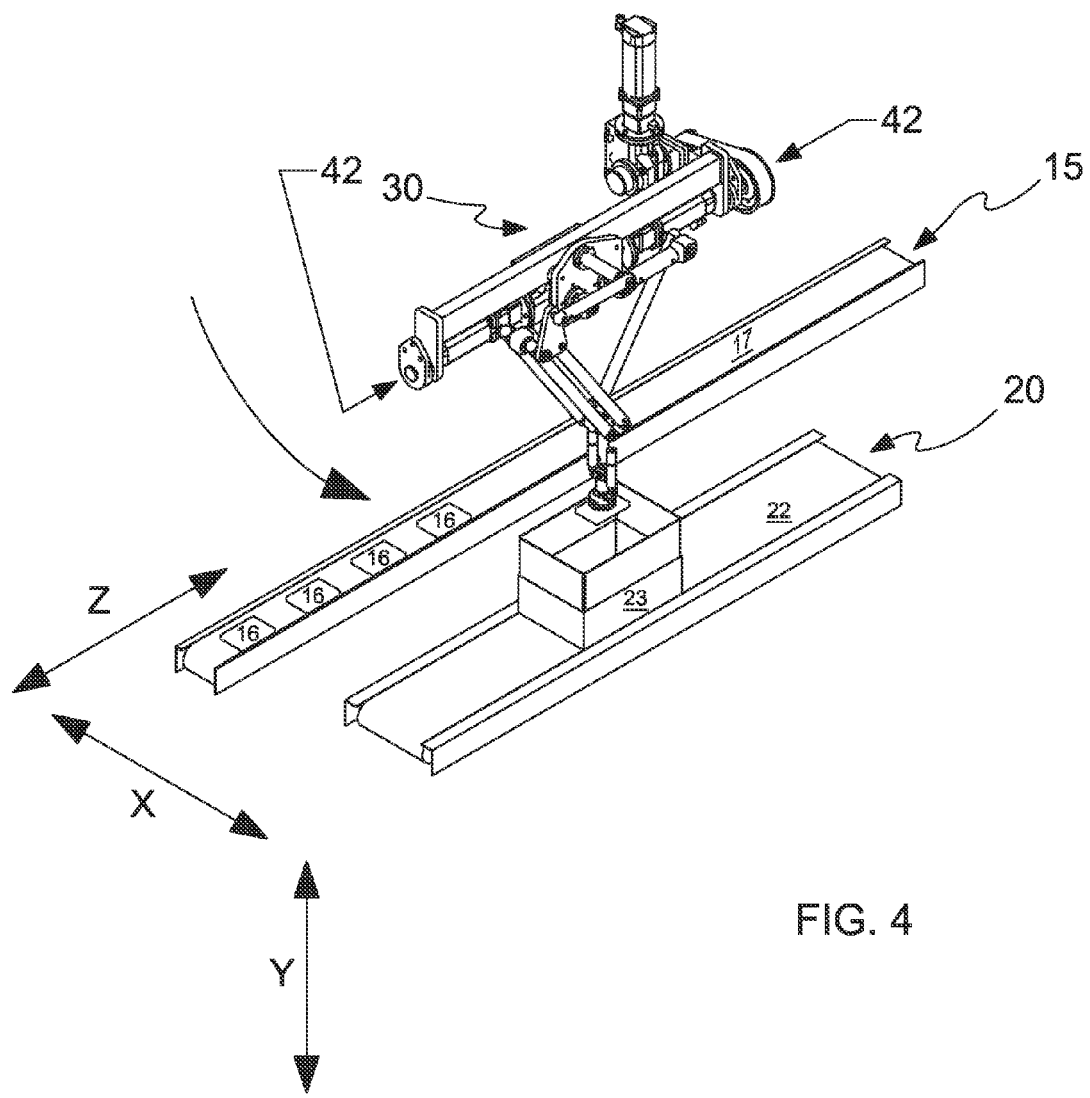
FIG. 4 is an isometric view illustrating an approximate mid-point position of the two-axis robot after rotation over a container for depositing the product in the container.
Figure 5:
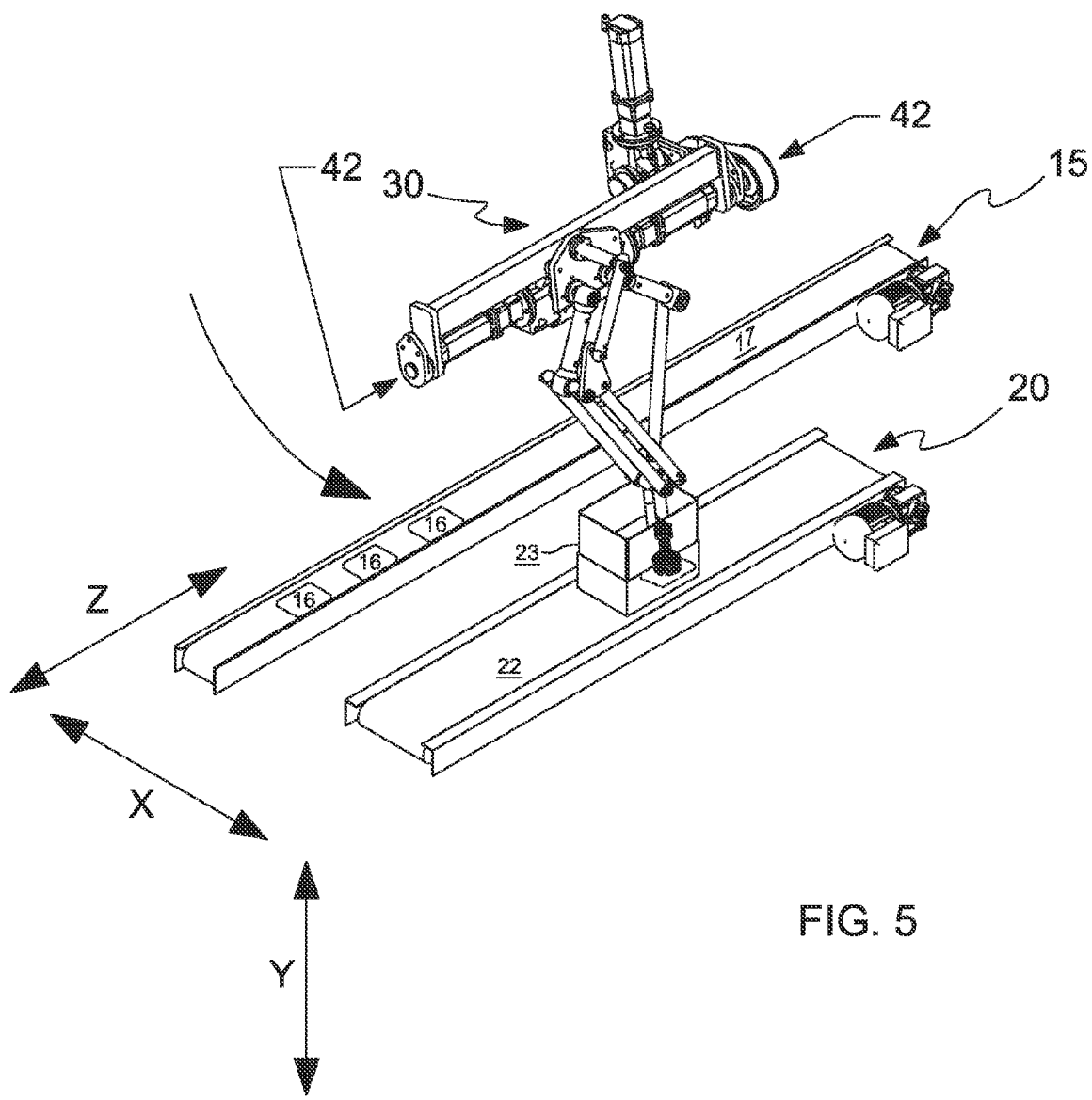
FIG. 5 is an isometric view illustrating the deposition of an article into a container.

Referring first to FIG. 1, the preferred embodiment of the robotic case packing system of the present invention is generally represented by a support frame 10 (shown schematically), a product conveying system 15, a case conveying system 20, a control system 25 (shown schematically by a photo cell), and a pick and place robotic mechanism 30.

The support frame 10 is adapted to support the pick and place mechanism 30 in order to enable the pick and place mechanism to travel along a desired path of operation to selectively pick an article from the conveying system 15 and place that article in a case or container 23 on the case conveyor 22. The frame 10 should provide a stable and stationary support for both the motor of the pick and place mechanism 30 and for the pivot drive shaft (described in greater detail below) of the pick and place robotic mechanism 30 in use. As such, the support frame 10 may take any of a variety of shapes and configurations suitable for providing the requisite stability and support for the pick and place mechanism 30. That is, the support frame 10 may be a stand-alone frame that is operatively associated with the product conveyor 15 to properly align the pick and place robotic mechanism 30 with the product conveyor 15. Alternatively, the support frame 10 may be part of a framework attached to the building in which the pick and place mechanism 30 is housed and utilized. It is believed that those of ordinary skill in the art will appreciate from the present disclosure the many forms that the support frame 10 may take. The support frame 10 is therefore shown schematically in FIG. 1 and is omitted from the remaining drawings of the present invention.

The conveying system 15 may be comprised of any of a number of readily available and suitable conveying systems that deliver product along a known (preferably known) path to a location at a desired rate for handling. In the preferred embodiment, the conveying system 15 includes a conveyor belt 17 and delivers product in a spaced manner (which spacing may be regular or random) and at a known, constant speed. In order to accurately monitor and control the known speed, in the preferred embodiment, a geared belt, similar to a timing belt, with an encoder is utilized. In turn, the conveying system 15 is positioned, relative to the pick and place robotic mechanism 30, below the pick and place mechanism 30, and slightly to one side of the pick and place mechanism 30. In the preferred embodiment, the conveying system 15 utilizes a conveyor belt 17 to move product in accordance with the present invention. It will be understood by those of skill in the art, however, that other conveying systems may be utilized to deliver a known quantity of product to a spot along a known line of motion.

The case conveyor 20 is adapted to move a corrugated cardboard case or similar container to a pre-selected spot for receipt of articles 16 from the conveyor 15. The case conveyor 20 may include a case erector and a conveyor belt for constructing corrugated cardboard cases or similar containers and moving them to the desired position for receipt of product. In the preferred embodiment, the case conveyor 20 comprises a case conveyor belt 22 that is positioned parallel to the conveyor belt 17 of the product conveyor 15 in use. The case conveyor belt 22 is further positioned in use a pre-selected distance from the product conveyor belt 17 and is further positioned to be horizontally below the product conveyor belt 17 in order to accommodate movement by the pick and place robotic mechanism 30 that is both over from the product conveyor 17 and downward to the case conveyor belt 22 as will be described in greater detail below.

In the preferred embodiment, the case conveyor belt 22 of the case conveyor 20 is disposed parallel to the product conveyor belt 17 of the product conveyor 15. It will be appreciated by those of skill in the art, however, that the positioning of the case conveyor may be varied in accordance with the present invention so long as the position of the case is adapted to coincide with the movement of the pick and place mechanism 30, in use, in order to receive product 16 from the pick and place mechanism 30.

The controller system 25 of the present invention, shown schematically or symbolically as a photo cell 25, is adapted to selectively actuate the pick and place mechanism 30 to move to the product conveyor belt 17 to pick up an article 16, following which the pick and place mechanism 30 moves to the case conveyor 20 in order to deposit the article 16 into a container 23 on the case conveyor 20. The controller system 25 may be comprised of a combination of any number of commercially available software packages and sensing mechanisms that are available in the marketplace for utilization with a two-axis-robot and a servo motor. For example, in the preferred embodiment, canned software from ELAU is utilized in conjunction with a two-axis-robot to actuate and control the motion of the pick and place mechanism in response to input from stimuli such as the photo cell 25 shown in FIG. 1.

Figure 15:
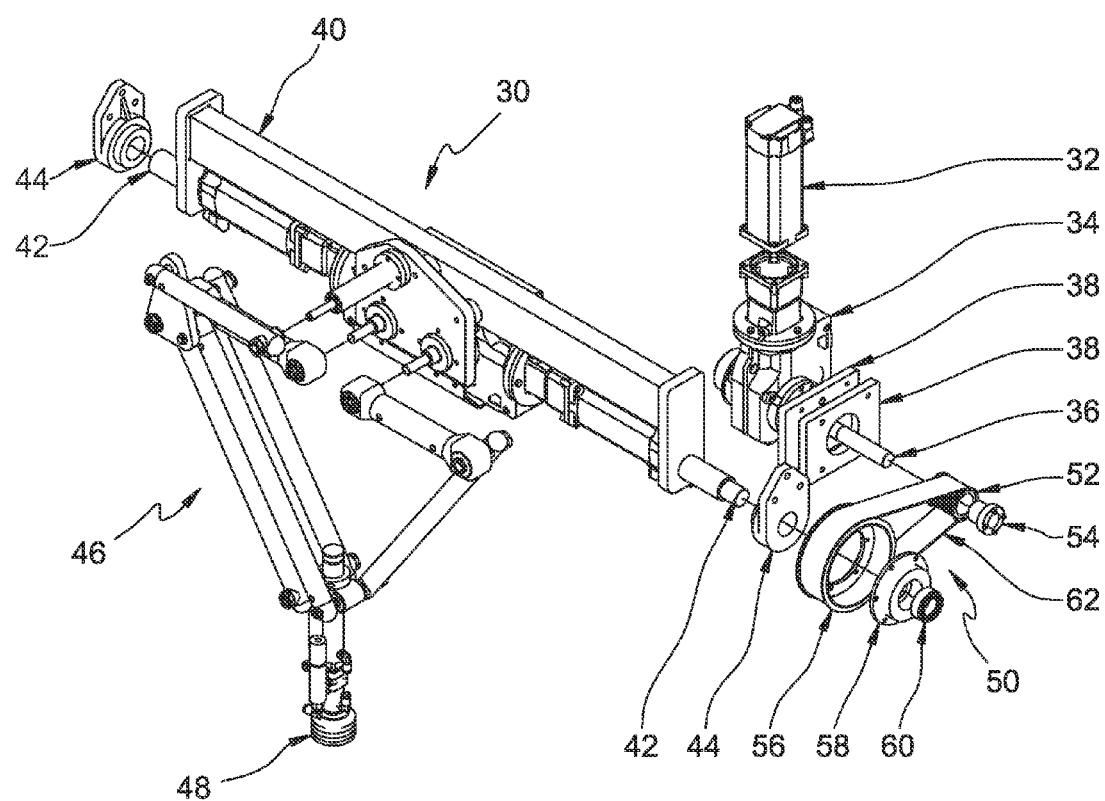
FIG. 15 is an exploded isometric view of the robotic case packing system shown in FIG. 14.

Referring now to FIG. 15, the pick and place mechanism 30 of the present invention includes a servo motor 32 that is connected to a gear box 34, which, in turn, is connected to a gear box shaft 36. The servo motor 32 and gear box 34 are connected to the frame 10 through the use of flanges 38 or similar supporting structure for securing the gear box 34 and motor 32 to the frame 10. Referring still to FIG. 15, the pick and place mechanism 30 further includes a pivot weldment 40 that is adapted for supporting a pivot drive shaft 42 for rotational movement in relation to the pivot weldment 40. The pivot weldment 40 and pivot drive shaft 42 are mounted to the frame 10 (not shown) by means of bearings 44, which are disposed at each end of the pivot drive shaft 42 and operatively connected to the pivot weldment 40 and the pivot drive shaft 42 such that the housings for the bearings 44 are secured in a stationary manner to the frame 10, while the pivot drive shaft 42 and the pivot weldment 40 are permitted to pivot or rotate about the axis of rotation defined by the pivot drive shaft 42.

The pick and place mechanism 30 further includes a two-axis-robot 46 mounted on the pivot drive shaft 42 along the axis of rotation such that movement of the two-axis-robot along its two axes movement occurs within planes of substantially parallel to the axis of rotation of the pivot drive shaft 42. A gripper 48 is attached to the two-axis robot 46 for attaching to and gripping an article of product 16 from the product conveyor belt 17. In the preferred embodiment, the gripper 48 is comprised of a vacuum pick head suitable for securing the anticipated product for which the case packing system is designed.

The pick and place mechanism 30 further includes a drive linkage 50 operatively connected between the servo motor 32 and the pivot drive shaft 42 in order to selectively rotate the pivot drive shaft 42 when desired. The drive linkage 50 may be comprised of any of a number of suitable drive mechanisms adapted for use between drive shafts such as the gear box drive shaft 36 and the pivot drive shaft 42 to translate the rotation of the gear box drive shaft 36 into desired rotation of the pivot drive shaft 42. In the preferred embodiment, the drive linkage 50 comprises a first pulley 52 that is connected to the gear box drive shaft 36 by a suitable bushing 54. The drive linkage 50 further includes a second pulley 56 that is suitably connected to the pivot drive shaft 42 by an appropriate hub 58 and locking assembly 60 as shown in FIG. 15 in exploded detail. As will be appreciated by those of skill in the art, the diameter of the pulley 52 and the diameter of the pulley 56 are each selected to provide the corresponding translation of rotation of the gear box pulley 52 and to rotation of the pivot drive shaft pulley 42. In turn, a drive belt 62 is disposed over the pulley 52 and the pulley 56 to provide the requisite translation of rotation from the pulley 52 to the pulley 56.

In the preferred embodiment, the gripper 48 comprises a vacuum pick assembly for selectively vacuuming and gripping a product 16 from the conveyor belt 17 and releasing the product 16 when desired. It will be appreciated by those of skill in the art, however, that other means for gripping the product 16 for handling may be utilized in accordance with the present invention.

Figure 6:
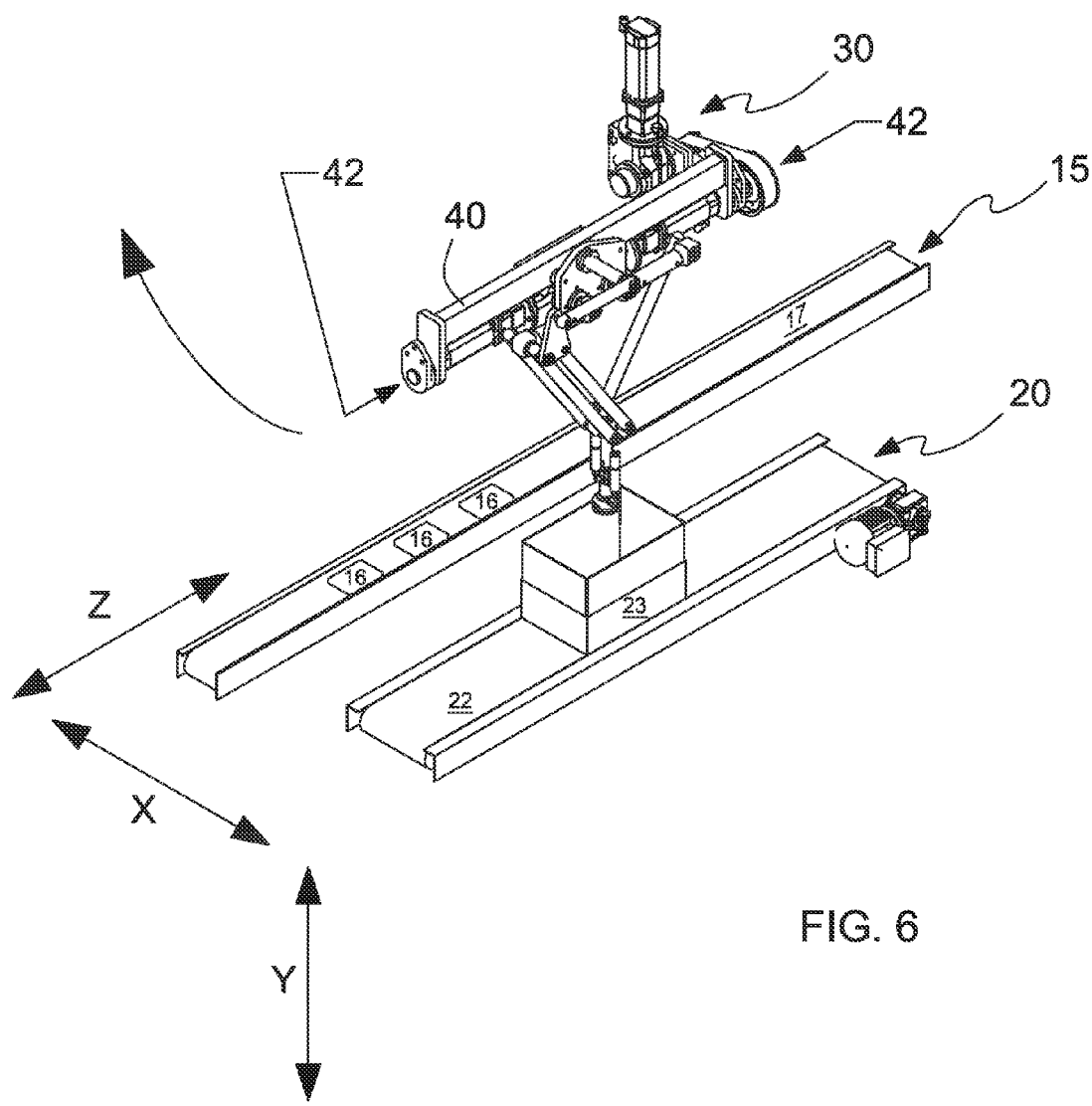
FIG. 6 is an isometric view illustrating the position of the two-axis-robot during the return to pick up an additional article from the product conveyor.
Figure 7:
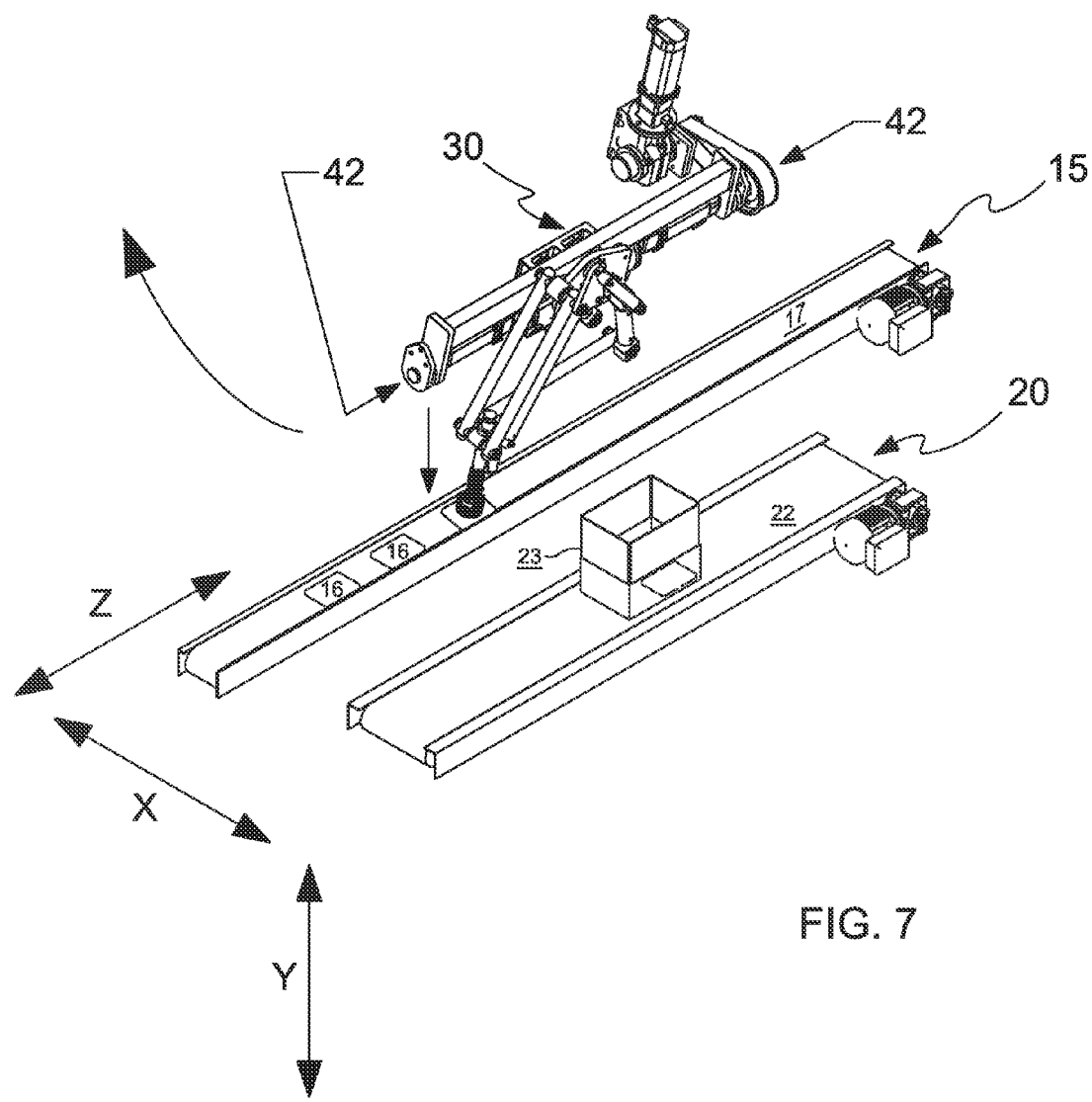
FIG. 7 is an isometric view illustrating the position of the two-axis-robot at the start of another cycle.
Figures 8, 9:
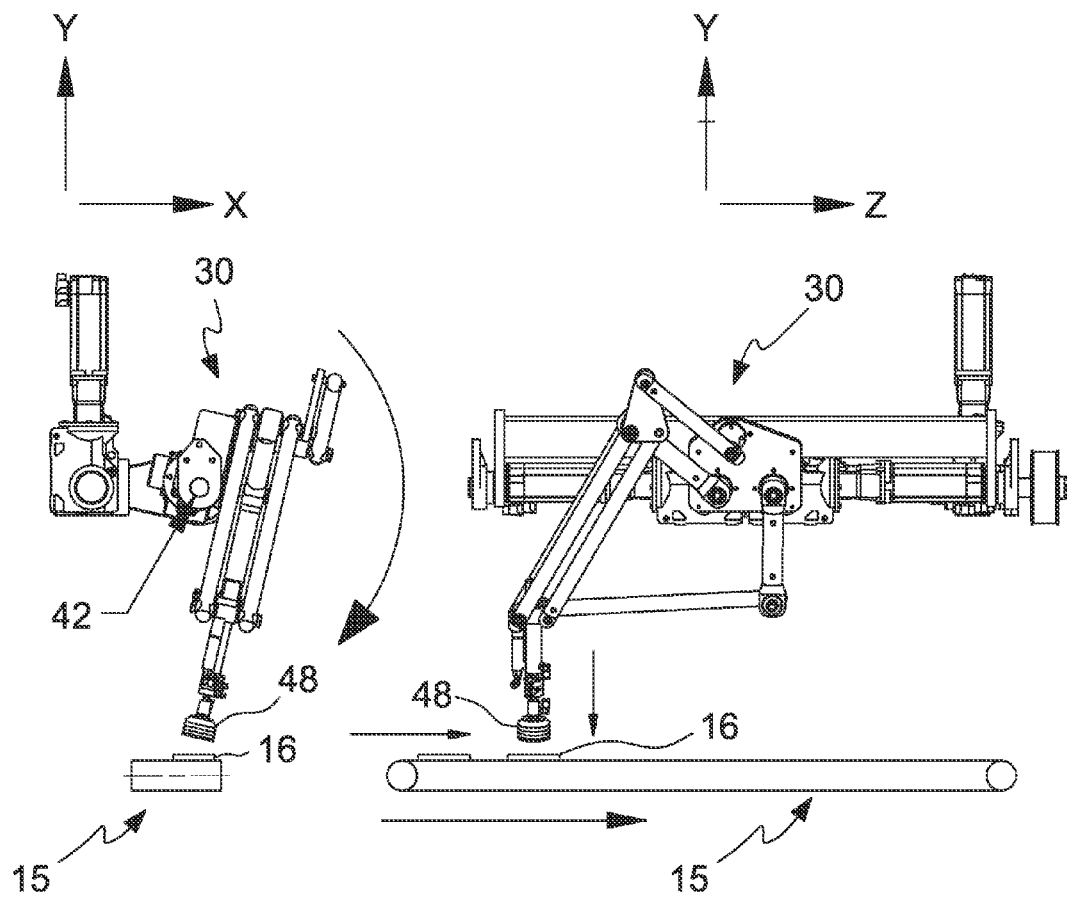
FIG. 8 is an end view of the robotic case packing system illustrating the orientation and position of the two-axis-robot in relation to the product conveyor as the two-axis-robot approaches the product conveyor to pick up an article.
FIG. 9 is a side view of the robotic case packing system shown in FIG. 8.
Figures 10, 11:
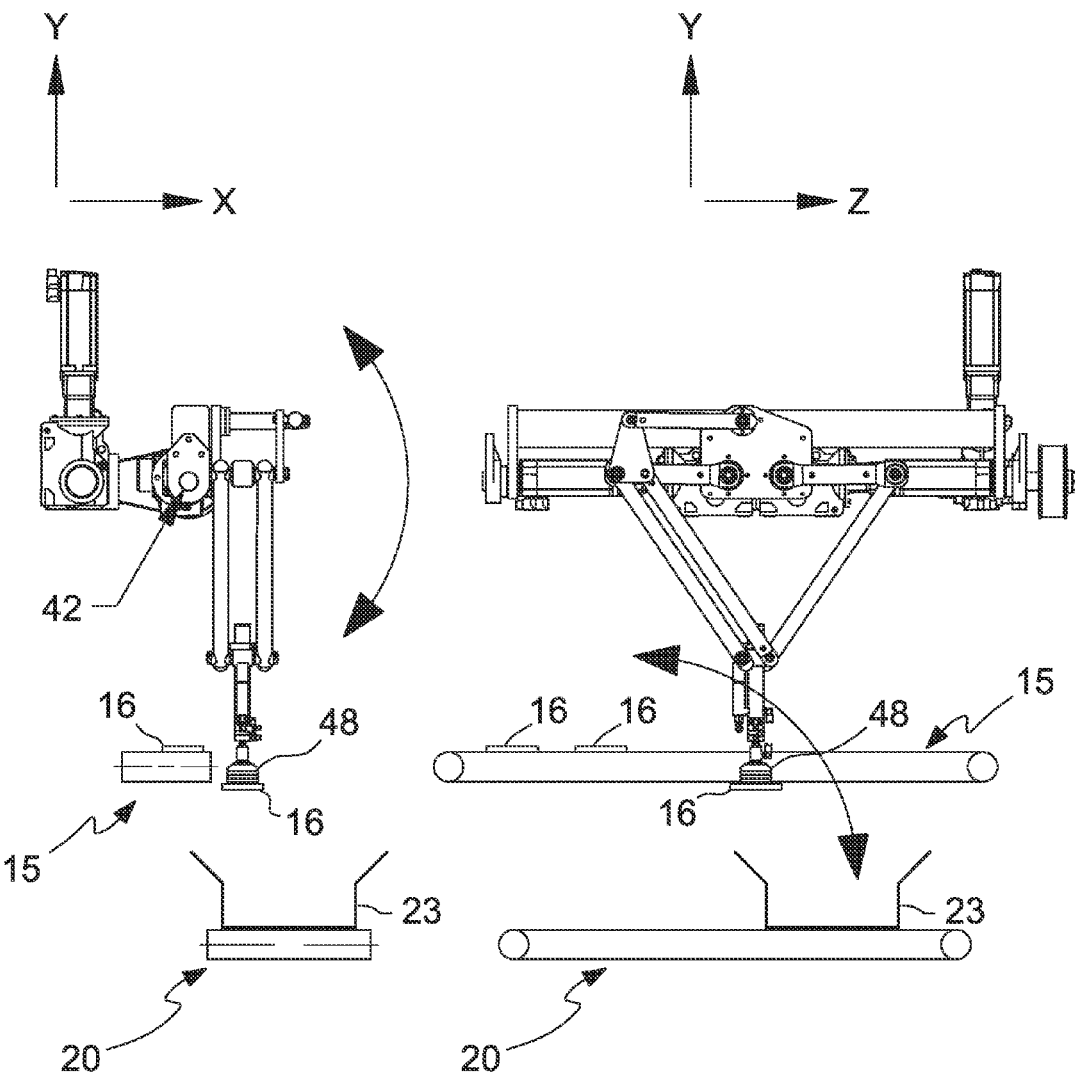
FIG. 10 is an end view of the robotic case packing system of the present invention illustrating the approximate mid-point rotation of the two-axis-robot to deposit an article from the product conveyor into a case or container.
FIG. 11 is a side view of the robotic case packing system shown in FIG. 10.
Figure 14:
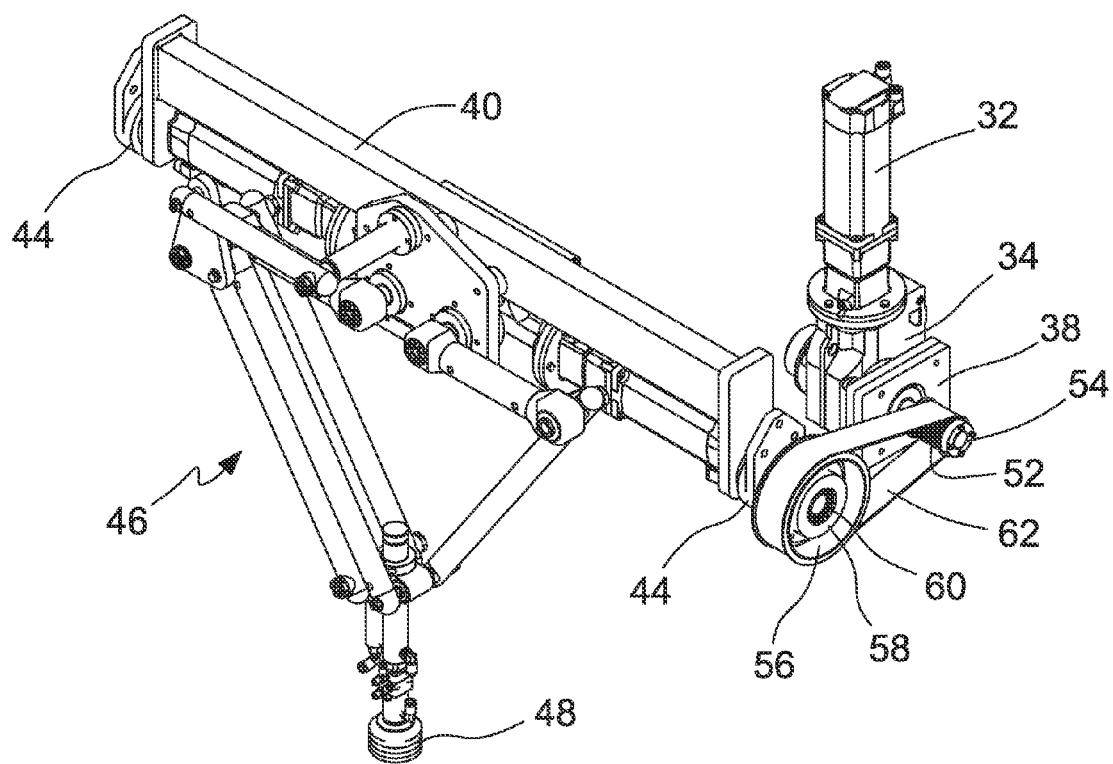
FIG. 14 is an isometric view of the robotic case packing system of the present invention detached from any frame or support.

Accordingly, when the robotic case packing system of the present invention is utilized, articles of product 16 are advanced along the conveyor belt 17 where they are sensed by a photo cell that is operatively associated with the controller 25. The controller 25 then actuates the servo motor 32 to pivot the two-axis robot 46 about the pivot drive shaft 42 so that the gripper 48 is aligned over the conveyor belt 17 as best seen in FIGS. 1, 2, 3, and 8. The controller 25 also actuates the two-axis robot mechanism 46 to cause downward movement of the gripper 48 to engage an article of product 16 as shown in FIGS. 7 and 8. The two-axis robot is then pivoted around the axis rotation defined by the pivot drive shaft 42 outwardly so that the gripper 48, which is holding an article of product 16, is swung over a container 23 on the case conveyor 20 as best seen in FIGS. 10, 11, 12, and 13. At the same time, the two-axis-robot is actuated to lower the product both downwardly into the case 23 to selectively deposit the article 16 in a desired location within the case 23. The two-axis-robot 46 is then lifted and rotated back to engage another article 16 on the product conveyor 15 as shown in FIGS. 6 and 7.

The robotic case packing system of the present invention thereby utilizes the speed of a two-axis-robot 46 to provide planer movement of a product gripper 48 to engage, pick and place a product. At the same time, the present invention provides a third degree of motion by oscillating or pivoting the two-axis-robot 46 back-and-forth a selected distance to quickly address the need for the third element of motion in the simplest and most speedy manner. It is believed that this design increases the speed with which product may be handled by a two-axis-robot 46 to lift an article of product 16 off a conveyor belt 17 and place it into a container 23. At the same time, it is believed that this design provides a simpler and less expensive mechanism for accomplishing this result.

In an alternative embodiment of the present invention that may be adapted for handling greater product quantities at greater speed, two or more pick and place robotic mechanisms 30 may be positioned and aligned along the conveyor 15 to increase the quantity of product 16 that may be handled off the conveyor 15. In this alternative (not shown), if two pick and place mechanisms are utilized, then the first mechanism may, for example, pick up the first, third, fifth, etc. article 16 on the belt 17; and the second pick and place mechanism may pick up the second, fourth, sixth, etc. article 16 on the belt 17. The number of articles 16 that each mechanism picks up before passing on an article will depend on the product rate, and has substantial flexibility. Generally, it may be advantageous (especially if the articles of product 16 are randomly spaced) to have each mechanism 30 in the line pick up as many articles 16 in a row as it is able before passing on an article 16. The use of two or more pick and place mechanisms 30 aligned along a conveyor thereby enables the handling of a multiple number of articles 16 in the same amount of time. Additionally, the number of articles 16 that may be loaded into each container 23 is not affected by the number of pick and place mechanisms 30 as was sometimes the case with prior devices. It will be appreciated by those of skill in the art in light of the present disclosure that yet additional pick and place mechanisms 30 may be aligned along the conveyor in accordance with the present invention in order to increase the speed of handling. Through the use of additional mechanisms

30, the only limitation on the number of products that may be handled is the speed of the conveyor belt 17.

The present invention has been disclosed in connection with a specific embodiment. However, it will be apparent to those skilled in the art that variations from the illustrated embodiment may be undertaken without departing from the spirit and scope of the invention. Such variations will be apparent to those skilled in the art and are within the spirit and scope of the invention.

What is claimed is:

1. A robotic case packing system for loading articles from a moving conveying system into a container, comprising:
    a product conveyor for conveying a plurality of articles along a selected line of motion;
    a case conveyor operatively disposed in relation to the product conveyor to deliver containers to a pre-selected location offset and horizontally beneath the line of motion of the product conveyor;
    a support frame;
    a servo motor connected to the support frame;
    a pivot drive shaft pivotally connected to the support frame and adapted for selective rotation about a selected axis of rotation;
    a drive linkage operatively connected between the servo motor and the pivot drive shaft to selectively rotate the pivot driveshaft about the axis of rotation upon selective actuation of the servo motor;
    a two-axis robot operatively mounted on the pivot drive shaft along the axis of rotation such that movement of the two-axis-robot along its two axes of movement occurs within planes substantially parallel to the axis of rotation of the pivot drive shaft;
    wherein the frame is operatively positioned in relation to the product conveyor such that the axis of rotation of the pivot drive shaft is above and substantially parallel to the line of motion of the product conveyor; and
    a controller operatively connected to the servo motor for selectively actuating the servo motor to selectively rotate the pivot drive shaft in order to enable selective picking and placing of articles from the conveyor.

2. A robotic case packing system for loading articles from a product moving conveyor, having a known line of movement, into a container that is positioned offset from and horizontally beneath the line of movement of the product conveyor, comprising:
    a support frame;
    a servo motor connected to the support frame;
    a pivot drive shaft pivotally connected to the support frame and adapted for selective rotation about a selected axis of rotation;
    a drive linkage operatively connected between the servo motor and the pivot drive shaft to selectively rotate the pivot driveshaft about the axis of rotation upon selective actuation of the servo motor;
    a two-axis robot operatively mounted on the pivot drive shaft along the axis of rotation such that movement of the two-axis-robot along its two axes of movement occurs within planes substantially parallel to the axis of rotation of the pivot drive shaft; and
    a controller operatively connected to the servo motor for selectively actuating the servo motor to selectively rotate the pivot drive shaft in order to enable selective picking and placing of articles from the conveyor,
    wherein the frame and the pivot drive shaft are operatively positionable in relation to the line of movement of the product conveyor such that the axis of rotation of the pivot drive shaft is above and substantially parallel to the line of motion of the product conveyor.

* * * * *